United States Patent [19]
Albers et al.

[11] Patent Number: 5,084,785
[45] Date of Patent: Jan. 28, 1992

[54] ASPHERIC ELLIPTICAL PARABOLOID SAFETY MIRROR

[75] Inventors: Christopher J. Albers, Woodlawn; David J. Albers, Springfield Township, Hamilton County; George R. Sontag, Jr., Miamiville, all of Ohio

[73] Assignee: Rovic Corporation, Cincinnati, Ohio

[21] Appl. No.: 522,673

[22] Filed: May 11, 1990

[51] Int. Cl.$^5$ ............................................. G02B 5/10
[52] U.S. Cl. ...................................... 359/868; 359/871
[58] Field of Search ........................ 350/629, 630, 631

[56] References Cited

U.S. PATENT DOCUMENTS

| | | | |
|---|---|---|---|
| 2,077,740 | 4/1937 | Caughlan | 350/630 |
| 2,771,001 | 11/1956 | Grutener | 350/630 |
| 3,774,995 | 11/1973 | Perret | 350/630 |
| 3,901,587 | 8/1975 | Haile | 350/629 |
| 4,390,253 | 6/1983 | Lobb | 350/505 |
| 4,436,372 | 3/1984 | Schmidt et al. | 350/629 |
| 4,730,914 | 3/1988 | Stout | 350/629 |
| 4,822,157 | 4/1989 | Stout | 350/629 |
| 4,938,578 | 7/1990 | Schmidt et al. | 350/629 |

FOREIGN PATENT DOCUMENTS

| | | | |
|---|---|---|---|
| 2420452 | 11/1979 | France | 350/629 |
| 159416 | 12/1963 | U.S.S.R. | 350/629 |

OTHER PUBLICATIONS

Goldberg et al.; Analysis of Para-Elliptic Reflector; Journal of the Optical Society of America, vol. 39; No. 6, Jun. 1949, pp. 497-500.
elmer; A Study in Street Lighting Reflector Design; Applied Optics; Feb. 1966, vol. 5, No. 2, pp. 343-349.

*Primary Examiner*—Scott J. Sugarman
*Assistant Examiner*—R. D. Shafer
*Attorney, Agent, or Firm*—Roy F. Schaeperklaus

[57] ABSTRACT

A safety mirror mountable adjacent the perimeter of a vehicle is provided for affording vehicle drivers the ability to observe from the driving position an area extending outwardly from at least one location inboard of the portion of the perimeter of the vehicle visible from the location of the mirror. The mirror has a convex aspheric elliptic paraboloid image reflecting mirror surface. The curvature of said mirror surface decreases from a point of maximum curvature spaced from a point of minimum curvature at the peripheral edge of the mirror. A plurality of such safety mirrors may be used as at the front corners of a school bus to afford the driver a view of an area contiguous to the sides of the vehicle and in front of the vehicle, as well as beneath the front of the vehicle ahead of the front wheels thereof.

6 Claims, 4 Drawing Sheets

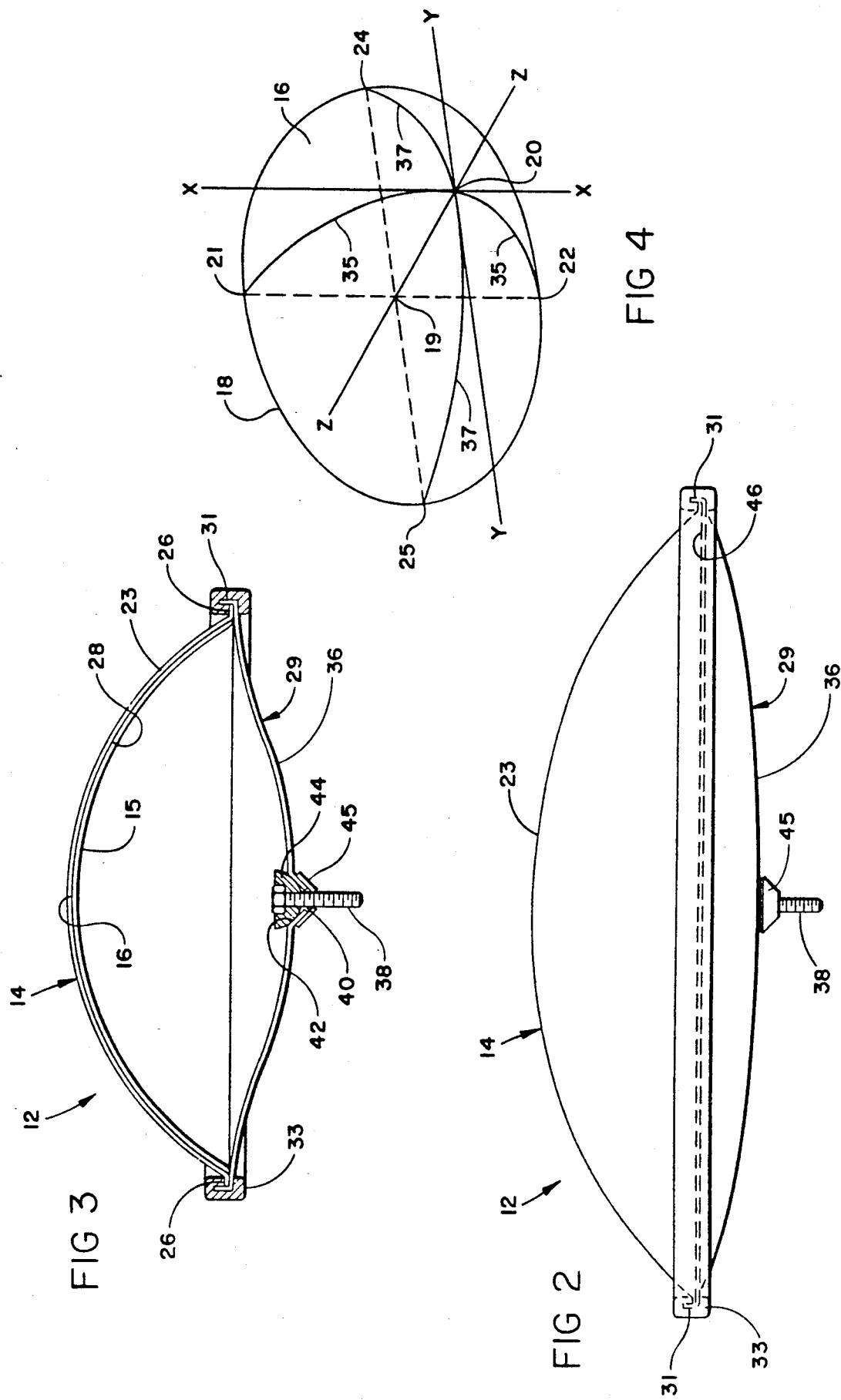

ASPHERIC ELLIPTICAL PARABOLOID SAFETY MIRROR

The present invention relates to mirrors, and in particular to safety mirrors for use on vehicles such as school buses or the like, each providing the driver of the vehicle with a view along a respective side and across the front of the vehicle including the area under the vehicle and ahead of the front wheels thereof.

BACKGROUND OF THE INVENTION

Various mirrors have been proposed and used in connection with vehicles to afford the operator thereof with a view of objects, either animate or inanimate, moving or stationary, in the vicinity of the sides and in front of the vehicle, and also to the rear of the vehicle to permit the operator to have surveillance of those areas so as to see not only stationary objects, but also moving objects such as other vehicles, pedestrians, animals or the like traveling courses which could lead to collision with the vehicle if not avoided. Such mirrors have been of the flat surface mirror, cylindrical surface mirror and spherical surface mirror types. The most common flat surface mirrors for vehicles are the rear view mirrors usually mounted near the top center of the windshield, also outboard of the side windows near the front of the vehicle and in the case of school buses also mounted on the front fenders thereof. At times such conventional flat mirrors are replaced by convex cylindrical or spherical mirrors to provide a wider angle of view. Also, at times plural mirror assemblies of flat and convex mirrors are used, usually as outside mirrors to provide the undistorted flat mirror view along with the wider angle of view of the convex mirror.

One area where mirrors have been relied upon for safety purposes is in conjunction with school buses where safety problems are accentuated by the fact that the passengers for the most part are children, who often for no apparent reason or for one reason or another will act unexpectedly in the vicinity of the bus. They on occasion will run or dart along paths that cannot always be anticipated and which on occasion place the children in locations of material danger due to the configuration of school buses which often have a hood and fenders ahead of the windshield, interfering with the driver's view of areas in the vicinity of the bus. Mirrors have been variously located on buses to afford the driver a view of the area in front of the bus and also areas laterally of the bus. One such type of mirror is a spherical mirror mounted on a tripod type support and located at the respective front corners of the bus which affords the driver a view of the area ahead of the bus which is obscured from the driver's direct view by intervening portions of the bus, such as the hood and fenders. However, such mirrors do not afford a view of the area ahead of the wheels of the bus and under the portion of the bus projecting forwardly of those wheels, an area into which small children can often venture in pursuit of a pet, a ball or other object upon which their attention is concentrated without regard to the possible movement of the bus by the operator unaware of their presence in such location.

An object of this invention is to provide a mirror which may be mounted at the respective front corners of a bus so as to afford the driver, from his operating position, a view of the area extending outwardly from the sides of the bus, the area ahead of the bus and the area beneath the overhanging front portion of the bus ahead of the front wheels of the bus.

Another object of this invention is to provide such convex mirror which has an aspherical elliptic paraboloid form reflective surface.

Another object of this invention is to provide such a mirror which may be fixedly mounted in an appropriate position of adjustment such that operation of the bus by drivers of differing heights within the normal range of driver heights will be afforded a substantially like view of the areas laterally and forwardly of the bus, and the area under the overhanging fore portion of the bus ahead of the front wheels of the bus, and thus render substantially unnecessary readjustment of the mirrors upon each change of driver.

A further object of this invention is to provide such a mirror having its maximum curvature at is center with curvature decreasing outwardly to its peripheral edge.

The present invention provides a first viewing mirror mounted adjacent a first front corner of the bus and having a convex elliptic paraboloid shaped reflective surface which affords the driver, from his operating position, a view of the area extending outwardly from a respective side of the bus around the front corner of the bus and across an area in the front of the bus, and extending under the front of the bus ahead of the front wheels thereof, while a second viewing mirror similarly mounted adjacent the opposite front corner of the bus simultaneously affords the driver a view of the area extending outwardly from a respective second side of the bus around the front corner of the bus across the area in front of the bus, and also the area beneath the fore part of the bus in front of the front wheels thereof.

Another object of this invention is to provide a mirror having an elliptic paraboloid reflective surface mounted in a suitable frame member which is in turn mounted by tripod or similar structure to the body of the bus in a way that it may be adjusted to provide the driver with an appropriate view of portions of the bus and areas adjacent while seated in the driver's seat, and having such coverage that such view is substantially provided to an occupant of the driver's seat so long as that occupant is within the normal size ranges of drivers of the vehicle.

The above and other objects and features of the invention will be apparent to those skilled in the art to which this invention pertains from the following detailed description and the drawings.

BRIEF DESCRIPTION OF THE DRAWINGS

FIG. 2 is a view of the mirror of FIG. 1 taken in the direction of the arrows 2—2 in FIG. 1;

FIG. 3 is a view in cross section of the mirror of FIG. 1 taken on the line 3—3 in FIG. 1;

FIG. 4 is a schematic perspective view of an elliptic paraboloid mirror surface in association with a set of Cartesion co-ordinate axes;

DETAILED DESCRIPTION OF THE PRESENTLY PREFERRED EMBODIMENT OF THE INVENTION

Figure 1:
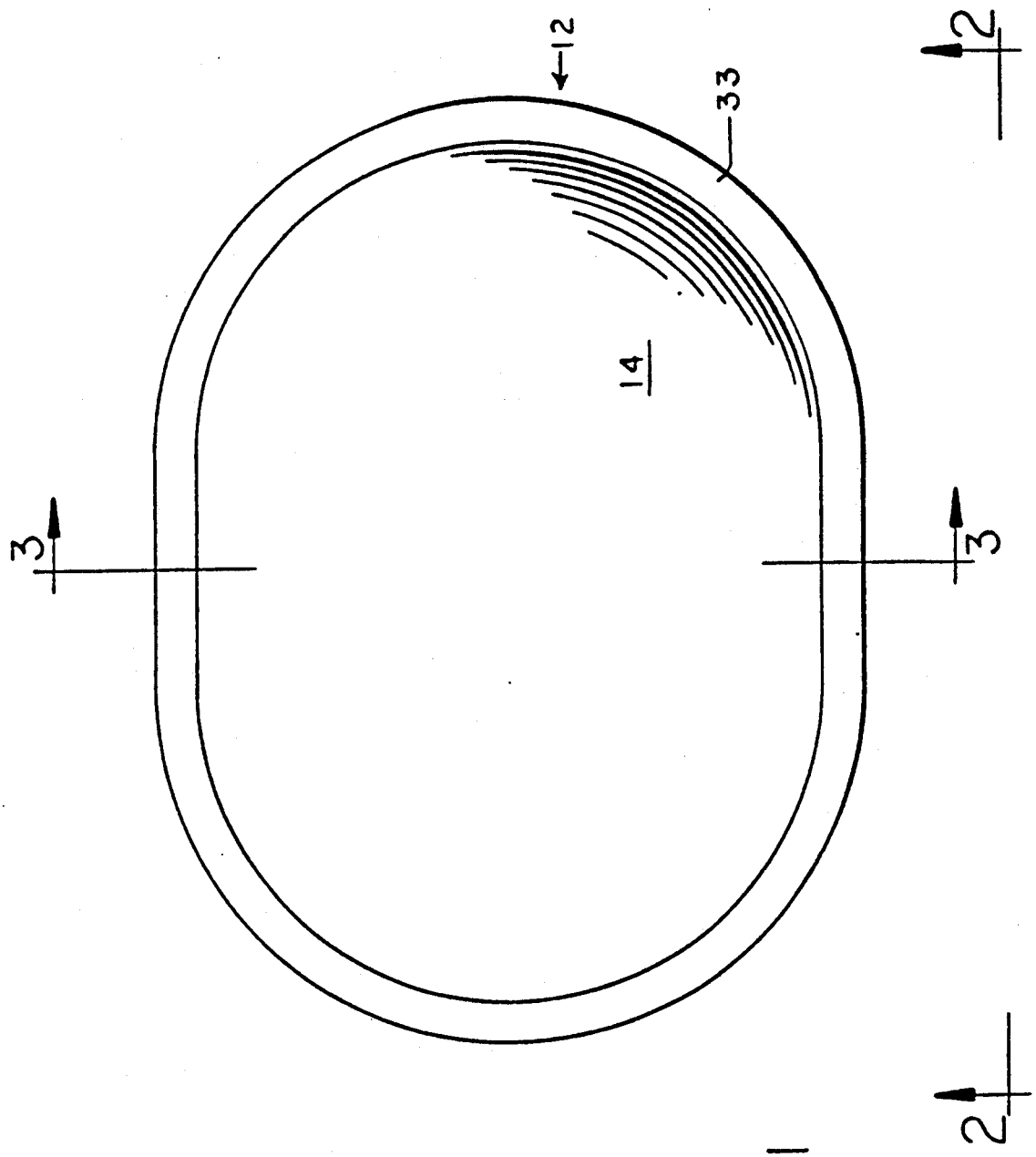
FIG. 1 is a view in elevation of a mirror embodying our invention.

In the accompanying drawings and the specification, like reference characters indicate like parts.

A mirror assembly 12 constructed in accordance with the instant invention and illustrating the presently preferred embodiment thereof is shown in the drawings. The mirror assembly 12 generally consists of a frame 29, a retainer 33 and a lens 14 having an exterior convex surface. The lens 14, which may be made of any suitable transparent material such as glass, acrylic resin or the like, has an aspheric elliptic paraboloid shape body 23 and an integral rim flange 26 projecting outwardly in a flat plane. The second (concave) surface 28 of the lens body 23 being provided with a reflective coating 15 of silver or the like. The reflective surface 16 has the shape of the second surface 28 of the lens body 23 and is preferably of an aspheric elliptic paraboloid shape. As illustrated in FIG. 4, the reflective surface 16 is symmetric about an axis Z perpendicular to the plane of the edge 18 of the surface remote from the viewer as viewed in FIG. 4. The edge 18 of the reflective surface 16 is an ellipse, lying in a plane parallel to the plane of the X-Y co-ordinate axes in FIG. 4. The intercept of the reflective surface in the X-Z plane is indicated by the parabolic line 35 extending through the points 21-20-22, a parabola symmetric about axis Z and tangent to the X-Y plane.

The reflective surface 16 intercepts the Y-Z plane along the line 37 extending through the points 24-20-25. The reflective surface 16 by reason of its aspheric elliptic paraboloid form is one which has a surface the curvature of which continuously changes from point to point on that surface with the sharpest curvature at 20 and decreasing curvature from 20 to edge 18. The reflective surface will have a respective parabolic intercept with any plane intersecting the surface 18 and including axis Z.

The intercepts of an aspheric elliptic paraboloid mirror surface with the X-Z, Y-Z, and X-Y planes of a coordinate system as in FIG. 4, may be expressed as follows:

the intercept in the X-Z plane: $z = cx^d$ [wherein c and d are constants for a respective parabolic intercept, but may vary from intercept to intercept];

the intercept in the Y-Z plane: $z = ay^b$ [wherein a and b are constants for a respective parabolic intercept, but may vary from intercept to intercept]; and the intercept in the X-Y plane: $x^2/e^2 + y^2/f^2 = 1$ [wherein e and f are respective radii of the elliptic perimeter of the mirror surface and may vary from intercept to intercept].

In applicants' presently preferred embodiment of their invention the reflective surface has an elliptic perimeter with a major axis (24-19-25 in FIG. 4) of 13.75 inches and a minor axis (21-19-22 in FIG. 4) of 9.75 inches and a depth (19-20 in FIG. 4) of approximately 3 inches, and may be described, by way of nonlimiting example, as follows:

the intercept in the X-Z plane: $z = 0.083x^{2.05}$
the intercept in the Y-Z plane: $z = 0.037y^{2.13}$; and
the intercept in the x-y plane: $x^2/(4.875)^2 + y^2/(6.875)^2 = 1$.

Other appropriate values may be substituted in the description of the aspheric elliptic paraboloid mirror surface by intercepts.

As shown in FIGS. 2 and 3, lens 14 has a radial flange 26 adapted to cooperate with frame 29. Frame 29 may be formed of sheet metal or other suitable material as shown in FIGS. 2 and 3. Frame 29 may have an outwardly convex central portion 36. A mounting stud 38 extends outwardly through a central apperture 40 in central portion 36 of frame 29. An inwardly facing concave seat 42 is provided annularly of the apperture 40 to cooperate with hemispheric grommet 44. A stud retaining V-washer 45 engages the exterior of the central portion 36 of the frame annularly of apperture 40 and the threaded stud 38 to secure the stud 38, hemispheric grommet 44 and seat 42, in assembled relation. An integral planner lens seat 46 is provided at the periphery of the central portion 36 of the frame. A cylindrical integral flange 31 extends perpendicularly from the peripheral edge of seat 46, the plannar surface upon which the lens rim flange 26 seats flatwise on the frame, and inboard of flange 31.

A mounting and sealing gasket ring 33 has an L-shaped channel 34 which receives cylindrical flange 31 and an adjacent part of seat 46 of frame 29 together with lens flange 26, securing the lens and frame in assembled relation as shown in FIGS. 2 and 3 and substantially sealing the lens and frame assembly.

The mirror assembly 12 may be mounted on a suitable bracket such as a tripod fender bracket 55 or 56 or other appropriate bracket by engaging the stud 38 in cooperating relation to the bracket and securing it by appropriate nut or other fastener (not shown), to support the mirror in fixed relation to the bus 50 or other vehicle substantially at a corner thereof. The mirror 12L mounted on the left front of the vehicle affords the driver a view along and outwardly from the left hand side of the bus, crosswise of the front of the bus from the bus forwardly and also of an area beneath the front portion of the bus forward of the front wheels of the bus.

Figure 6:
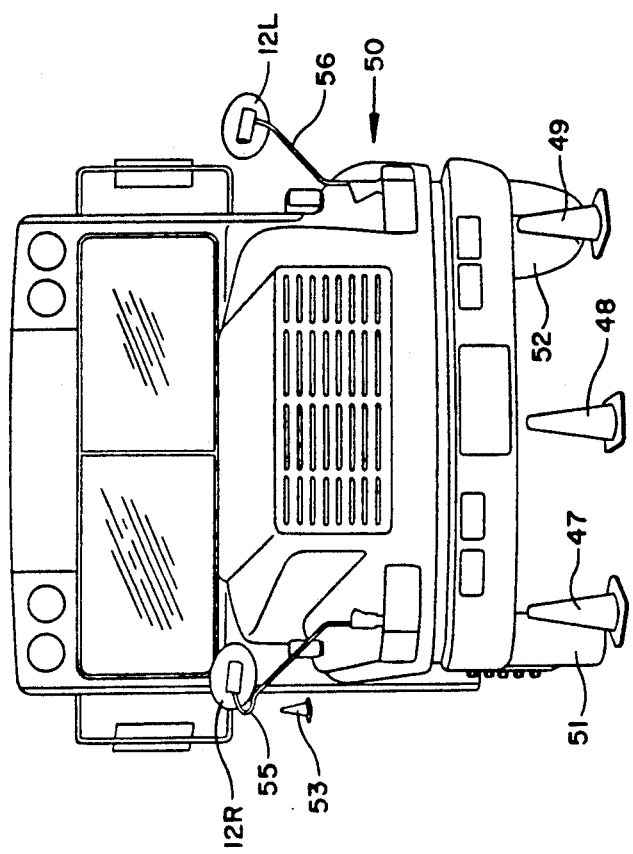
FIG. 6 is a front view in perspective of the bus of FIG. 5.
Figure 5:
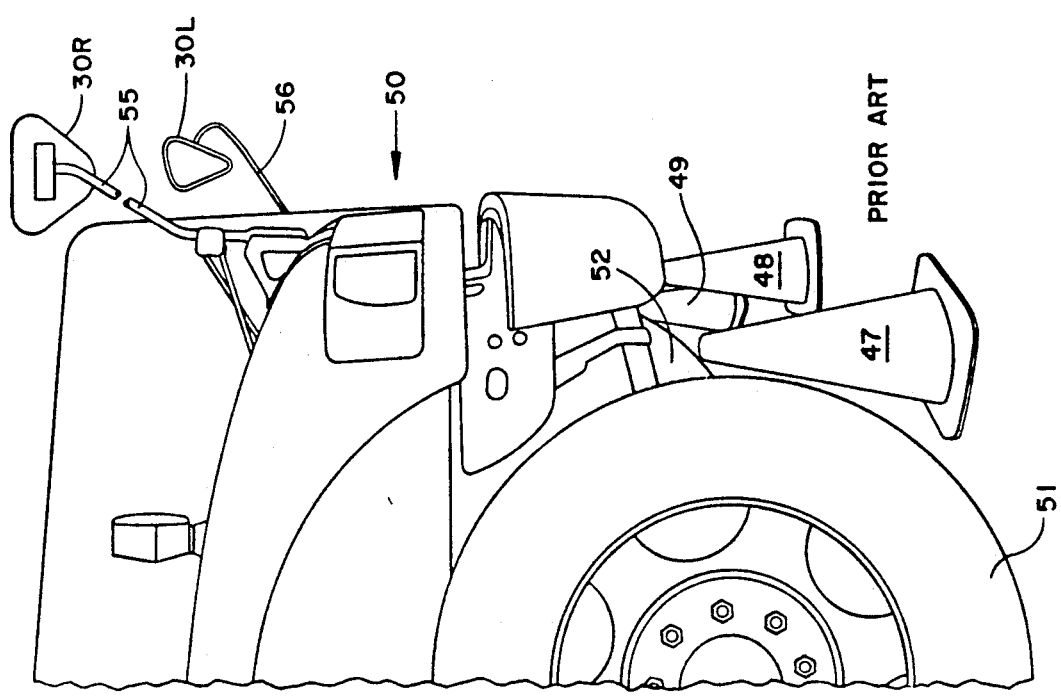
FIG. 5 is a fragmentary view in perspective of the front portion of a bus equipped with safety mirrors embodying the instant invention.
Figure 8:
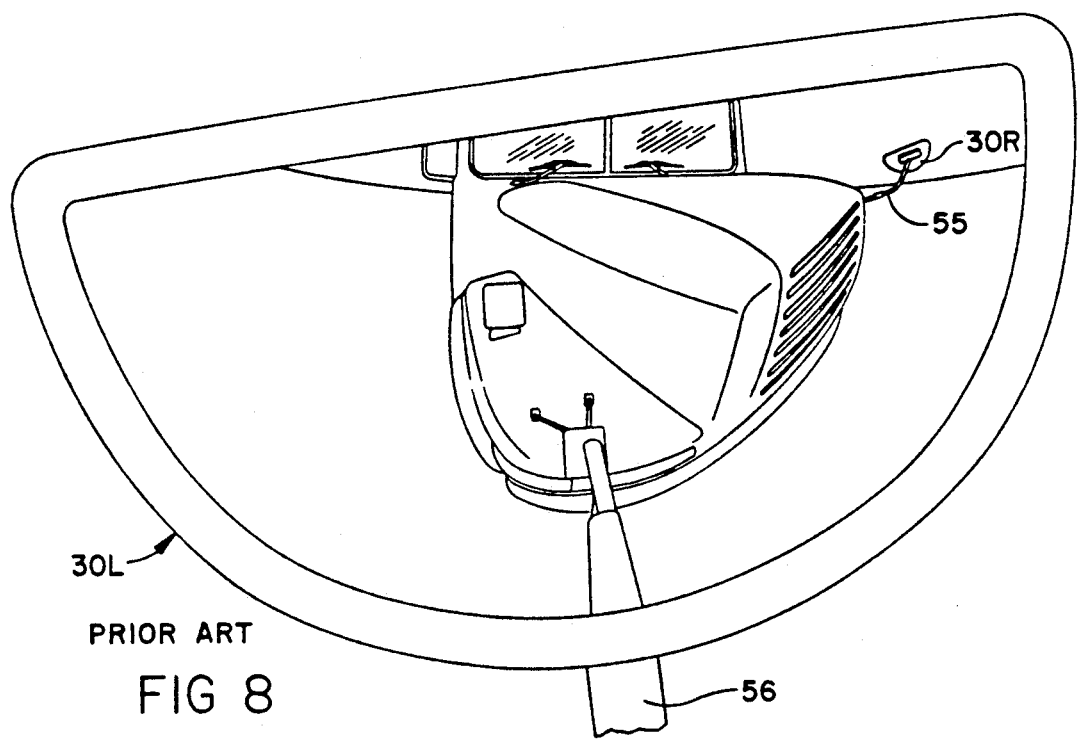
FIG. 8 is a view of the bus reflected for viewing by the driver in a widely used convex spherical mirror of the prior art substituted for the mirror of FIG. 8.
Figure 7:
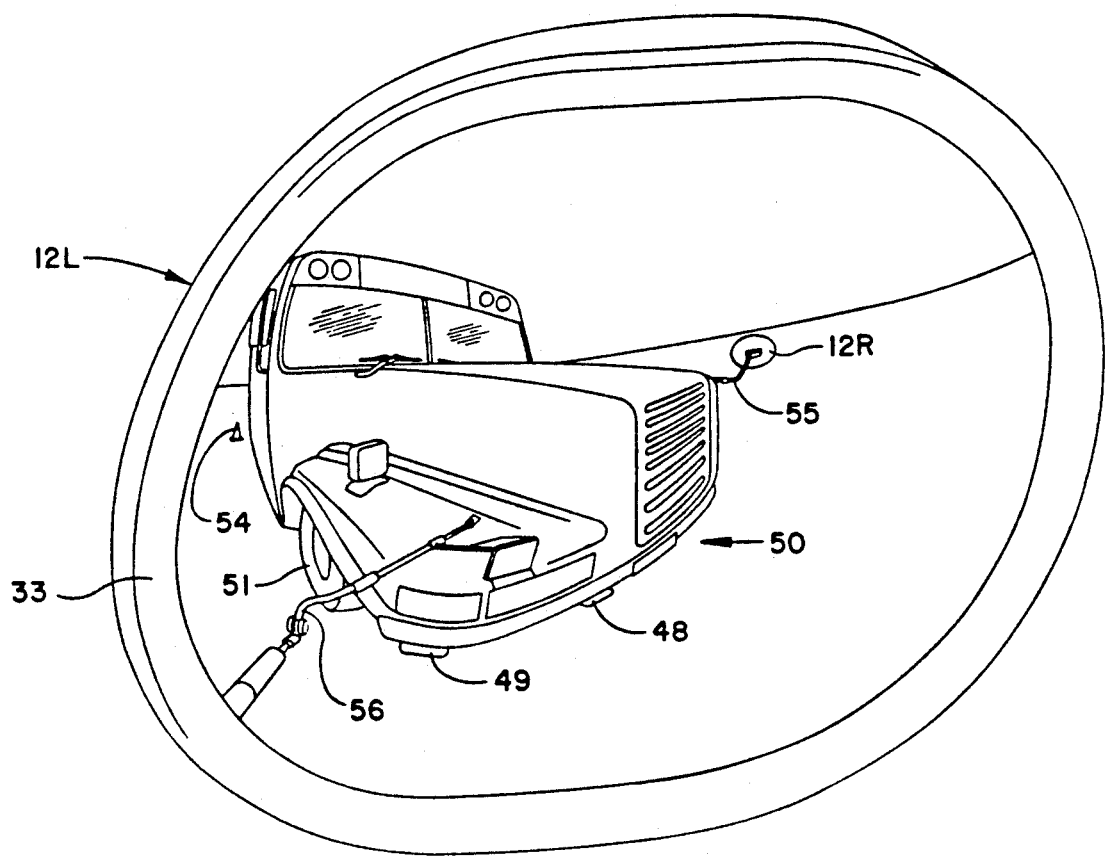
FIG. 7 is a view in perspective of a mirror embodying the instant invention and illustrating the view of the bus reflected by said mirror for viewing by the operator of the bus in the driver's seat thereof.

A plurality of traffic cones 47, 48 and 49 may be placed under the fore part of the bus 50 and ahead of its front wheels 51, 52, and, a cone 53 (shown in FIG. 6) and another cone 54 shown in the mirror image in FIG. 7, may be placed adjacent the respective sides of the bus rearward of its back wheels as shown in FIGS. 5, 6 and 7. When the bus is equipped with spherical mirrors 30 of the prior art shown in FIG. 5, images of the cones 47, 48, 49 and 54 are not reflected in mirror 30L as shown in FIG. 8 and are therefor not visible to the driver. Similarly images of cones 49, 48, 47 and 53 are not reflected in mirror 30R and are therefor not visible to the driver. However, when mirrors 12L and 12R embodying the instant invention are substituted for mirrors 30L and 30R as shown in FIG. 6, images of cones 48, 49 and 54 are reflected in mirror 12L and thus visible to the driver as shown in FIG. 7, and images of cones 48, 47 and 53 are similarly reflected in mirror 12R where they are visible to the driver as well.

The invention has been described above in connection with a presently preferred embodiment for purposes of illustration and not for purposes of limitation of the invention. The invention covers alternatives, modification and equivalents within the spirit and scope of the invention hereof.

The safety mirror construction illustrated in the drawings and described above is subject to modification without departing from the spirit and scope of the appended claims.

Having described our invention, what we claim as new and desire to secure by letters patent is:

1. A safety mirror comprising a convex aspheric elliptic paraboloid image reflecting mirror surface, said convex mirror surface having an axis of symmetry intersecting its point of maximum curvature, said reflecting mirror surface having a continuous peripheral edge spaced from said axis, the curvature of said mirror surface decreasing from said axis to said peripheral edge.

2. A safety mirror as in claim 1 wherein the peripheral edge lies in a flat plane.

3. A safety mirror as in claim 1 wherein the peripheral edge is elliptic and lies in a plane perpendicular to the axis of symmetry of the mirror surface.

4. A safety mirror as in claim 1 wherein the peripheral edge lies in a flat plane or a plannar radial flange extends outwardly from the edge in the flat plane.

5. A safety mirror as in claim 1 further comprising a lens supporting the reflecting mirror surface and having an annular rim flange, a frame having an annular rim seat, the rim flange seated on said rim seat and a retainer receiving said rim seat of said frame and said rim flange of said lens and securing same in abutting relation.

6. A safety mirror comprising a portion of a convex aspheric elliptic paraboloid image reflecting mirror surface having a continuous peripheral edge, said convex mirror surface having maximum curvature at one point and the curvature of said mirror surface decreasing as distance increases from said one point toward said peripheral edge.

* * * * *